United States Patent Office 3,457,218
Patented July 22, 1969

3,457,218
CIS-POLYBUTADIENE STABILIZED WITH
AN EPOXIDE
Friedrich Haas, Cologne-Buchheim, Kurt Vohwinkel and Karl Nützel, Cologne-Stammheim, and Hubert Sutter, Cologne-Flittard, Germany, assignors to Farbenfabriken Bayer Aktiengesellschaft, Leverkusen, Germany, a corporation of Germany
No Drawing. Filed Jan. 12, 1966, Ser. No. 520,060
Claims priority, application Germany, May 28, 1965, F 46,174
Int. Cl. C08c 11/32
U.S. Cl. 260—45.8  2 Claims

ABSTRACT OF THE DISCLOSURE

Stabilization of cis-1,4-polybutadiene with 0.5 to 5% by weight of an epoxide.

---

1,4-cis-polybutadiene is used on a large scale for the manufacture of motor car tires, especially the tread surfaces. These tires are extraordinarily abrasion-resistant and have little tendency to tear formation. These factors are especially advantageous when the tires are subjected to severe stresses due to bad driving and bad roads. On wet roads, however, the polybutadiene in the tires is frequently a disadvantage due to the diminished grip of the tires on the road. The road grip can be significantly improved by the addition of relatively large quantities of oil (about 20 to 50 parts by weight for 100 parts by weight of rubber) and carbon black (about 70 to 110 parts by weight for 100 parts by weight of rubber). However, if such large quantities of oil and carbon black are incorporated using of apparatus usually employed in the rubber industry, long mixing times are required and the distribution of the carbon black is poor. As a result of this, not only are the mechanical properties of the vulcanisates impaired but the strength of the unvulcanised crude mixture is markedly diminished, and this may lead to severe disturbances in the working up process.

The above described disadvantages which may occur with the use of polybutadiene solid rubber, i.e. poor distribution of carbon black and oil, inferior mechanical properties of the vulcanisates and reduced strength of the crude mixture, are avoided by using an oil extended polybutadiene.

Polybutadiene oil rubber is mainly produced by two processes:

(1) By altering the polymerisation conditions, the degree of polymerisation and hence the viscosity of the 1,4-cis-polybutadiene is greatly increased. After the addition of relatively large quantities of oil (30 to 50 parts by weight for 100 parts by weight of rubber) to the solution of this polybutadiene, followed by working up by known processes, a product is obtained which has a reasonable cold flow and which can easily be stored and transported.

It is, however difficult to apply this material as in particular the crude mixture cannot be sprayed readily. Moreover, the very highly viscous material cannot be conveyed properly, so that additional expenditure is required for the polymerisation apparatus.

(2) By adjustment of the necessary viscosity after the addition of oil in a separate reaction. For this purpose, the finished polymer is treated e.g. with Friedel-Crafts catalysts and cocatalysts or, e.g. with sulphur halides. See U.S. Patent 3,374,191.

It has now been found that both pure 1,4-cis-polybutadienes and the oil extended 1,4-cis-polybutadienes produced by the processes described cannot be stabilised sufficiently with the usual stabilisers (e.g. 2,2'-methylene-bis-(4-methyl-6-tertiary butylphenol)).

One particular disadvantage of the product is the inadequate stability to storage and the tendency to degradation, especially at elevated temperatures. This instability results mainly in a change in the viscosity.

It has now been found that the storage stability of 1,4-cis-polybutadiene and especially of oil extended 1,4-cis-polybutadiene can be significantly improved with the use of small quantities of epoxides, these additions of epoxides being an advantage especially if the storage temperatures and working up temperatures are high and if the polybutadienes are at the same times exposed to air. One preferred embodiment consists in the use of aromatic epoxides. The use of epoxides for improving the stability of 1,4-cis-polybutadienes during storage and during hot mixing is new.

The present invention is generally applicable to polybutadienes containing a high percentage of 1,4-addition. It is usually preferred that the polybutadiene contains at least 85 percent cis 1,4-addition, e.g., 85 to 98 percent and higher. These polybutadienes can be prepared by polymerizing 1,3-butadiene with a large number of different stereospecific catalysts. It is usually preferred to employ a catalyst which is selected from the group consisting of (1) a catalyst comprising an organometal compound having the formula $R_mM$, wherein R is alkyl, cycloalkyl, aryl, alkaryl, aralkyl, alkylcycloalkyl or cycloalkylalkyl, H is aluminum, mercury, zinc, beryllium, cadmium or magnesium, and $m$ is equal to the valence of the metal M, and titanium tetraiodide, (2) a catalyst comprising an organometal compound having the formula $R_nM'$, wherein R is an organo radical as defined above, M' is aluminum, magnesium or lead, and $n$ is equal to the valence of the metal M', titanium tetrachloride, (3) a catalyst comprising an organometal compound having the formula $R_aM''$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine, (4) a catalyst comprising an organometal compound having the formula $R_xM'''$, wherein R is an organo radical as defined above, M''' is aluminum, gallium, indium or thallium, and $x$ is equal to the valence of the metal M''', a titanium halide having the formula $TiX_4$, wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst comprising an organo compound having the formula $R_xM'''$, wherein R, M''' and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, Y is chlorine or bromine, and $d$ is an integer from 2 to 5, inclusive. The R radicals of the aforementioned formulae preferably contain up to and including 20 carbon atoms, (6) a catalyst combination of a cobalt compound and a compound of the formula $R_yXMe$, wherein R is an organic radical, $y$ is 1 or 2, depending on the valency of Me, X is an organic radical or a halogen atom and Me is a metal of the second or third group of the periodic table it is an alkaline earth metal or aluminum, (7) a catalyst consisting of lithium metal or an organic lithium compound including addition compounds.

The following are examples of preferred catalyst systems which can be used to polymerize 1,3-butadiene to a cis 1,4-polybutadiene: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide.

Epoxides which are suitable are obtainable by known processes and have the general formula

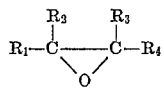

in which $R_1$, $R_2$, $R_3$ and $R_4$ may denote a hydrogen atom, an aliphatic radical with 1 to 24 C-atoms, a cycloaliphatic radical with 5 to 24 C-atoms, an aromatic radical and an araliphatic radical with 6 to 24 C-atoms. The said hydrocarbon radicals may contain oxygen—and nitrogen—and/or sulphur atoms.

The following compounds may be mentioned as examples: Styrene oxide, diepoxy-butane, phenoxy-propylene-oxide, diglycidyl anilide and the diglycidyl ether of 4,4'-dihydroxydiphenyldimethylmethane etc. It is preferred to use epoxides which contain aromatic nuclei and which are only slightly volatile with steam.

These epoxides are added to the polybutadiene in quantities of 0.1 to 5% by weight, preferably 0.1 to 1.5% by weight based on the solid rubber. The incorporation of the epoxides into the polybutadiene can be carried out with the usual aids. One particularly simple method, which leads to optimum distribution, consists in the addition of epoxides or their solutions to the polybutadiene solution after polymerisation, e.g. with the aid of a continuous flow mixer. The temperature during the addition is not very important and may be selected between $-10°$ and $+150°$ C.; a temperature of between $+30$ and $80°$ C. is however preferred. If oil extended 1,4-cis-polybutadiene is produced the epoxide may be added after, before or together with the extending oil.

This oil extended 1,4-cis-polybutadiene comprises 1,4-cis-polybutadiene as defined above and a rubber extending oil. The extending oil may be present in an amount of about 20 to 120 parts, preferably 30 to 70 parts by weight based on 100 parts by weight of 1,4-cis-polybutadiene.

Any rubber extending oil may be used. Especially suitable are paraffinic, naphthenic and aromatic mineral oils and vegetable oils for e.g. linseed-oil. These oils are usually classified according to their viscosity density constants as shown in the following table:

| Viscosity-density-constant: | Kind of oil |
| --- | --- |
| 0.790–0.819 | Paraffinic. |
| 0.820–0.849 | Slightly naphthenic. |
| 0.850–0.899 | Naphthenic. |
| 0.900–0.949 | Slightly aromatic. |
| 0.950–0.999 | Aromatic. |
| 1.000–1.049 | Very aromatic. |
| >1.050 | Extremely aromatic. |

It has been found advantageous to introduce the epoxide or its solution in an organic solvent, preferably the solvent used for polymerisation, into the polybutadiene solution before the addition of oil. If sulphur halides are used for increasing the viscosity, it is possible to add the epoxide before, after or together with the sulphur halide to the polymer solution.

Finally, the epoxides may, of course, be added to the polybutadiene and oil extended polybutadiene at any stage of the working up process, for example before drying by spraying an aqueous dispersion of it on to the polymer lumps as they are formed, during drying etc.

The presence of the epoxides does not interfere with the usual course of working up, i.e. for example the precipitation of the polymer with hot water and the simultaneous removal of solvent with steam.

The stabilisers according to the invention may also be incorporated by any working up apparatus usual in the rubber industry, e.g. roller mills and internal mixers. In that case, the above mentioned improvement of the storage stability of the oil rubber is equally well achieved.

It is advantageous to use the epoxides together with the usual stabilising agents as for instance staining and non-staining stabilisers and antioxidants in the usual amounts, especially suitable stabilisers are for instance 2,2'-methylene-bis-(4-methyl-6-tert.-butylphenol), 4 - methyl-2,6-di-tert.-butylphenol and 4-hydroxy-3,5-di-tert.-butylbenzylmethyl ether.

The reduced stability of polybutadiene oil rubbers manifests itself almost exclusively by a lowering of the viscosity. The increase in viscosity not infrequently occurring in solid rubbers, which is also called cyclisation, is hardly observed in oil rubbers and if it occurs at all, it is only when the rubbers are subjeted to extreme conditions of temperature. In both cases, a viscosity test may be used as criterion for the stability, and this is carried out for example in dependence upon the storage time and/or the storage temperature. It has been found that a suitable method for rubbers is the determination of the Mooney viscosity (DIN 53,523) or the Defo hardness (DIN 53,514). To ascertain the stability properties, the rubber sheets are stored for different lengths of time at different temperatures in circulating air cupboards, the temperatures of which can be accurately controlled. Under comparable conditions, the test times can be shortened by using higher storage temperatures since no basic differences in the nature of the response occur at lower and higher temperatures. Storage temperatures of 20 to 160° C. and storage times varying from a few minutes to several weeks are employed and different stabilised materials are compared.

A drop in Mooney viscosity is generally found to occur with increasing temperatures and increased storage times. This viscosity drop can be considerably retarded or even completely prevented at lower storage temperatures by using the stabilisers acording to the invention optionally together with other known stabilisers. Such an improvement in the stability of oil extended polybutadiene and the stability during the preparation of the mixture in the internal mixer.

The following examples serve to illustrate the invention and explain it more completely. The parts given are parts by weight.

Example 1

12,000 parts of butadiene are polymerised with exclusion of air in 12,000 parts of toluene, using a catalyst system of an iodine-containing titanium compound and an aluminum alkyl. The temperature, the proportions of catalyst components and the absolute quantity of catalyst are so adjusted that a 1,4-cis-polybutadiene having a viscosity of ML-4' (100° C.)≈40 (Mooney viscosity) is produced. The reaction is contained until the yield has risen to 98% and polymerisation is then terminated by the addition of 240 parts of disproportionated abietic acid, and the residual monomer is driven off by increasing the temperature. The reaction mixture is divided into four equal parts and each part is gradually introduced into a tank which is connected into a flow circuit and into which solutions can be dosed with the aid of a continuous flow mixer.

(a) Part 1 is treated with a mixture of 15 parts of 3,3'-dimethyl - 5,5' - di - tertiary - butyl - 6,6' - dihydroxy-diphenylmethane in 150 parts of toluene. The viscosity of the polybutadiene is then increased by the addition of 18 parts of di-sulphur-dichloride, dissolved in 500 parts of toluene. After 5 minutes, 37.5 parts of a highly aromatic oil per 100 parts of polybutadiene is dosed into the mixture, the solvent is driven off in a second vessel equipped with stirrer by introducing the solution into hot water, and the oil rubber is then dried.

(b) Part 2 is treated in the same way as part 1 but 15 parts of the diglycidyl ether of 4,4'-dihydroxy-diphenyl-dimethylmethane dissolved in 100 parts of toluene are introduced into the polymer solution by means of the continuous flow mixer before the oil is added.

(c) Part 3 is treated in the same way as part 1 but 30 parts of the diglycidyl ether of 4,4'-dihydroxy-diphenyl-dimethylmethane dissolved in 200 parts of toluene are dosed in by means of the continuous flow mixer after the addition of the extender oil.

(d) Part 4 is treated in a manner similar to part 1 but 0.5 part of the diglycidyl ether of 4,4'-dihydroxydiphenyl-dimethylmethane per 100 parts of rubber are mixed into the finished oil rubber on the rolling mill after the drying.

STABILITY TEST.—MOONEY DETERMINATION AFTER STORAGE IN HOT AIR AT 140° C.

| Storage times (h.) | Examples | | | |
|---|---|---|---|---|
| | 1a | 1b | 1c | 1d |
| 0 | 40 | 41 | 39 | 40 |
| 0.5 | 20 | 42 | 38 | 37 |
| 1.0 | 15 | 40 | 39 | 34 |
| 1.5 | (¹) | 38 | 36 | 28 |
| 2.0 | | 36 | 34 | 24 |
| 2.5 | | 36 | 31 | 16 |
| 3.0 | | 32 | 38 | (¹) |
| 3.5 | | 28 | 25 | |
| 4.0 | | 28 | 23 | |

¹ No longer measurable.

STABILITY TEST.—MOONEY DETERMINATION AFTER STORAGE IN HOT AIR AT 70° C.

| Storage times (d.) | Examples | | | |
|---|---|---|---|---|
| | 1a | 1b | 1c | 1d |
| 0 | 40 | 41 | 38 | 40 |
| 1 | 18 | 40 | 40 | 47 |
| 3 | 26 | 40 | 40 | 35 |
| 4 | 24 | 41 | 39 | 32 |
| 7 | 17 | 41 | 37 | 38 |
| 14 | (¹) | 39 | 36 | 24 |

¹ No longer measurable.

Example 2

9000 parts of butadiene are polymerised with 120,000 parts of benzene with a combination of a cobalt-containing compound and an aluminum alkyl chloride. The variables of polymerisation are so adjusted that the polybutadiene obtained has a Mooney viscosity (ML–4' (100° C.)) of 100 to 110. After polymerisation, the catalyst is deactivated with 200 parts of methanol, and the polymer solution is treated with 90 parts of 2,6-ditertiary-butyl-4-methylphenol. The yield of 1,4-cis-polybutadiene after the unreacted butadiene has been driven off is 96%. The polymer solution is divided into three equal parts.

(a) Part 1 is treated as described in Example 1 with 37.5 parts of a highly aromatic oil per 100 parts of polybutadiene and worked up.

(b) Part 2 is first treated with 37.5 parts of an aromatic oil per 100 parts of solid rubber as described in Example 1. 15 parts of 4-tertiary-butyl-phenoxypropylene oxide dissolved in 150 parts of benzene are then added. The product is then worked up in the usual way.

(c) In the same way as part 1, part 3 is treated with oil, precipitated and dried. 15 parts of phenoxypropylene oxide are worked into the crude oil rubber on the rollers.

STABILITY TEST—MOONEY DETERMINATION AFTER STORAGE IN HOT AIR AT 140° C.

| Storage time (h.) | Examples | | |
|---|---|---|---|
| | 2a | 2b | 2c |
| 0 | 42 | 43 | 40 |
| 0.5 | 26 | 42 | 38 |
| 1.0 | 16 | 37 | 39 |
| 1.5 | 16 | 34 | 21 |
| 2.0 | (¹) | 30 | 24 |
| 2.5 | | 28 | 18 |
| 3.0 | | 22 | 19 |
| 3.5 | | 18 | (¹) |
| 4.0 | | 18 | |

¹ No longer measurable.

Example 3

9000 parts of butadiene are polymerised to 96% in 90,000 parts of toluene with a catalyst system consisting of an iodine-containing titanium compound and an aluminium alkyl. The polymerisation conditions are so chosen that the Mooney viscosity of the 1,4-cis-polybutadiene ML–4' (100° C.) is 40. The catalyst is deactivated with 90 parts of aluminium ethyl dichloride. After all the residual monomer has been driven off, the solution is divided into three equal parts and each part is introduced into the apparatus according to Example 1a.

(a) The first third is treated with 4 parts of thionyl chloride dissolved in 100 parts of toluene. This is deactivated after 30 minutes with 100 parts of methanol. 37.5 parts of an aromatic oil are then stirred into the mixture per 100 parts of polybutadiene and the product worked up as described.

(b) The second third is treated like the first third but prior to the working up, 15 parts of diglycidyl anilide dissolved in 100 parts of toluene are added by means of the continuous flow mixer. The product is then worked up as described.

(c) The last third is also treated like the first third but the lumps formed by precipitation of the polybutadiene with hot water are treated with a dispersion of 30 parts of phenoxypropylene oxide. The product is then dried in the usual manner.

STABILITY TEST.—MOONEY DETERMINATION AFTER STORAGE IN HOT AIR AT 140° C.

| Storage time (h.) | Examples | | |
|---|---|---|---|
| | 3a | 3b | 3c |
| 0 | | 41 | 39 | 40 |
| 0.5 | | 18 | 40 | 39 |
| 1.0 | (¹) | 37 | 34 |
| 1.5 | | 35 | 29 |
| 2.0 | | 32 | 23 |
| 2.5 | | 31 | 19 |
| 3.0 | | 27 | 14 |
| 3.5 | | 20 | (¹) |
| 4.0 | | 15 | |

¹ No longer measurable.

Example 4

As described in Example 1 a solution of 1,4-cis-polybutadiene is produced by a suitable choice of the polymerisation conditions this solution is adjusted to a Mooney viscosity or ML–4 (100°)=45. The polymerisation is terminated as described in Example 1 and stabilized with 0.5% of 3,3-di-methyl-5,5-di-tert.-butyl-6,6-di-hydroxy-di-phenyl-methane based on the weight of the solid polymer.

The solution thus obtained is divided into two parts. The first part (I) is left untreated and to the second part (II) 0.4% by weight of diglycidylether of bis-phenol A based on the weight of the solid polymer is added.

Both solutions are processed as in Example 1.

STABILITY TEST—MOONEY DETERMINATION AFTER STORAGE IN HOT AIR AT 140° C.

| Storage time (h.) | I | II |
|---|---|---|
| 0 | 45 | 45 |
| 0.5 | 39 | 45 |
| 1 | 35 | 44 |
| 1.5 | 30 | 43 |
| 2.0 | 27 | 43 |
| 2.5 | 20 | 41 |
| 3.0 | 19 | 42 |
| 3.5 | 20 | 42 |
| 4.0 | 20 | 44 |
| 5 | 21 | 43 |
| 6 | 23 | 43 |

We claim:

1. A composition of matter comprising 1,4-cis-polybutadiene and 0.5 to 5% by weight based on the 1,4-cis-polybutadiene of an epoxide of the general formula

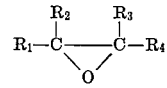

wherein $R_1$, $R_2$, $R_3$ and $R_4$ represent a hydrogen atom, an aliphatic radical with 1 to 24 C-atoms, a cycloaliphatic radical with 5 to 24 C-atoms, an aromatic radical with 6 to 24 C-atoms or an araliphatic radical with 6 to 24 C-atoms, as a stabiliser.

2. A composition of matter comprising 1,4-cis-polybutadiene and 0.5 to 5% by weight based on the 1,4-cis-polybutadiene of 4-tertiary-butyl-phenoxy-propylene oxide as a stabiliser.

References Cited

UNITED STATES PATENTS

| | | | |
|---|---|---|---|
| 2,912,407 | 11/1959 | Reynolds | 260—33.6 |
| 3,068,197 | 12/1962 | Rocklin | 260—45.85 |
| 3,240,841 | 3/1966 | Hsieh | 260—836 |
| 3,287,301 | 11/1966 | Fysh et al. | 260—23.7 |
| 3,361,691 | 1/1968 | Mazzeo | 260—23.7 |
| 3,144,422 | 8/1964 | Homberg | 260—23 |
| 3,392,142 | 7/1968 | Leyland et al. | 260—45.8 |

DONALD E. CZAJA, Primary Examiner

R. A. WHITE, Assistant Examiner

U.S. Cl. X.R.

260—33.6, 45.95